US008542288B2

(12) United States Patent
Waqas et al.

(10) Patent No.: US 8,542,288 B2
(45) Date of Patent: Sep. 24, 2013

(54) CAMERA SYSTEM AND IMAGING METHOD USING MULTIPLE LENS AND APERTURE UNITS

(75) Inventors: Malik Waqas, Stuttgart (DE); Muhammad Siddiqui, Esslingen (DE)

(73) Assignee: SONY Corporation, Tokyo (JP)

( * ) Notice: Subject to any disclaimer, the term of this patent is extended or adjusted under 35 U.S.C. 154(b) by 74 days.

(21) Appl. No.: 13/239,991

(22) Filed: Sep. 22, 2011

(65) Prior Publication Data
US 2012/0105690 A1 May 3, 2012

(30) Foreign Application Priority Data

Nov. 3, 2010 (EP) .................................... 10014267

(51) Int. Cl.
H04N 5/225 (2006.01)
H04N 5/262 (2006.01)
H04N 7/00 (2011.01)
H04N 13/00 (2006.01)
H01L 27/00 (2006.01)
G01T 1/161 (2006.01)

(52) U.S. Cl.
USPC ............ 348/218.1; 348/239; 348/36; 348/42; 250/208.1; 250/363.06

(58) Field of Classification Search
USPC ... 348/218.1, 36–39, 42–50, 239; 250/208.1, 250/363.06
See application file for complete search history.

(56) References Cited

U.S. PATENT DOCUMENTS 7,965,314 B1 * 6/2011 Miller et al. .................. 348/164
2010/0310246 A1 * 12/2010 Campbell ....................... 396/89
2012/0019613 A1 * 1/2012 Murray et al. .................. 348/36

OTHER PUBLICATIONS

Samuel W. Hasinoff, et al., "Multiple-Aperture Photography for High Dynamic Range and Post-Capture Refocusing", IEEE Transactions on Pattern Analysis and Machine Intelligence, vol. 1, No. 1, Jan. 2009, pp. 1-17.
Frederic Guichard, et al., "Extended depth-of-field using sharpness transport across color channels", Society of Photo-Optical Instrumentation Engineers, Proceedings of Electronic Imaging, 2009, 13 pages.

* cited by examiner

Primary Examiner — Nhan T Tran
Assistant Examiner — Marly Camargo
(74) Attorney, Agent, or Firm — Oblon, Spivak, McClelland, Maier & Neustadt, L.L.P.

(57) ABSTRACT

A camera system (100) comprises a plurality of imaging units (190), wherein each imaging unit (190) includes a lens unit (120) and an aperture unit (110), and wherein the apertures (115) of the aperture units (110) have different size during an exposure period. A plurality of images of the same scene are captured at different aperture sizes during an exposure period, wherein the images are shifted versions of the scene and feature different depth-of-field and exposure value ranges. A processing unit (200) applies a high-dynamic resolution and/or a super-resolution method on the basis of the obtained images.

10 Claims, 4 Drawing Sheets

CAMERA SYSTEM AND IMAGING METHOD USING MULTIPLE LENS AND APERTURE UNITS

FIELD OF THE INVENTION

The present invention relates to the field of post-capture digital image processing techniques. An embodiment relates to a camera system with a plurality of imaging units, wherein each imaging unit comprises a lens unit and an aperture unit. Further embodiments refer to a method of operating a camera system using a plurality of imaging units, each imaging unit comprising a lens and an aperture unit.

DISCUSSION OF THE BACKGROUND

Hasinoff et al., "Multiple-Aperture Photography for High Dynamic Range and post-Capture Refocusing", IEEE Transactions on Pattern Analysis and Machine Intelligence, Vol. 1, No. 1, January 2009 describes a method of generating a HDR (high dynamic range) image on the basis of time-sequentially captured images using a variable aperture. F. Guichard et al., "Extended Depth-of-Field using Sharpness Transport across Colour Channels", SPIE, Proceedings of Electronic Imaging, 2009, refers to a method of obtaining images with extended depth-of-field where, for a given object distance, at least one colour plane of an RGB image contains the in-focus scene information.

SUMMARY

The object of the present invention is providing an enhanced camera system for obtaining enhanced images with low computational effort. The object is achieved with the subject-matter of the independent claims. Further embodiments are defined in the dependent claims, respectively. Details and advantages of the invention will become more apparent from the following description of embodiments in connection with the accompanying drawings. Features of the various embodiments may be combined unless they exclude each other.

DETAILED DESCRIPTION

Figure 1:
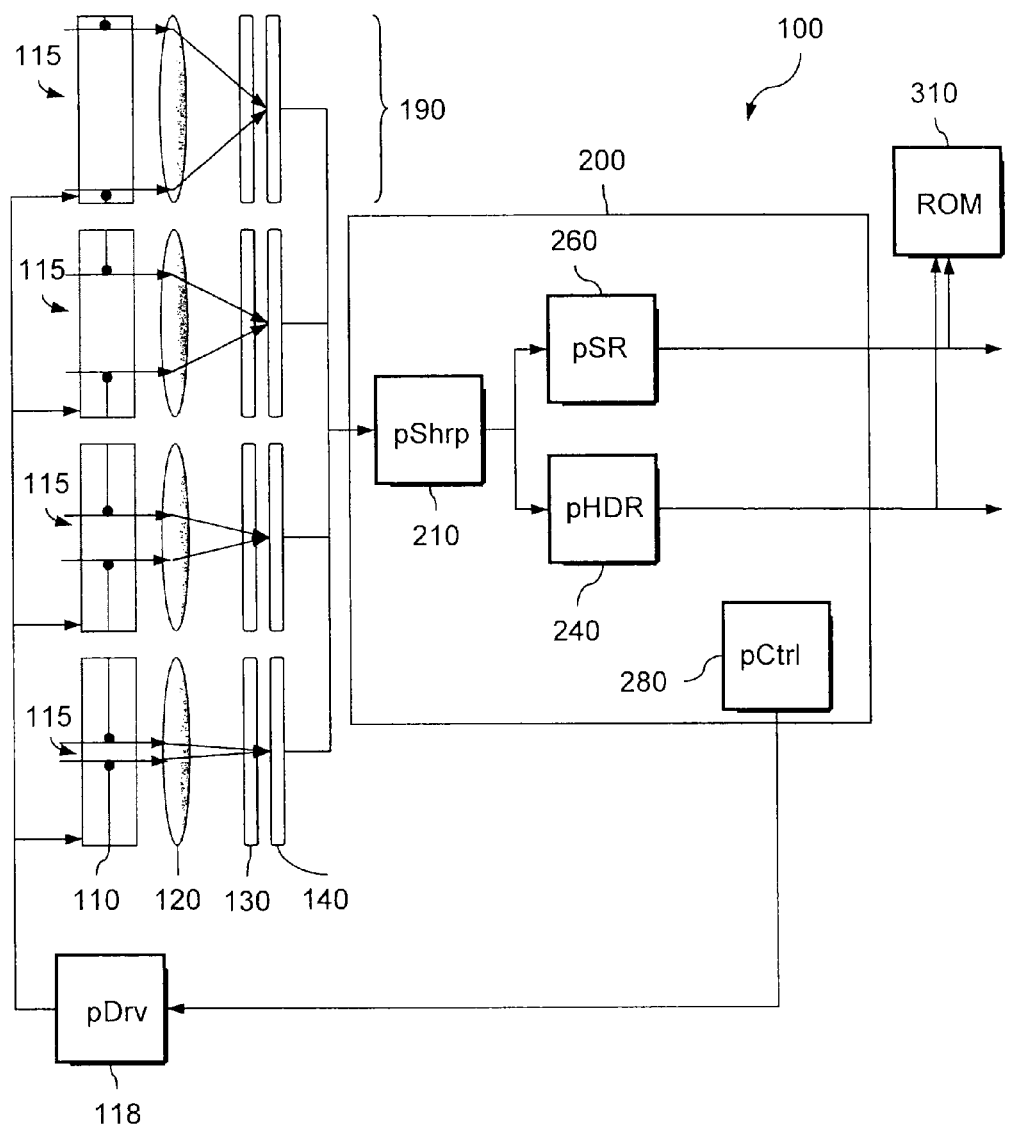
FIG. 1 is a schematic block diagram of a camera system including a plurality of imaging units providing different apertures sizes in accordance with an embodiment of the invention.

FIG. 1 shows a camera system 100 with several imaging units 190. Each imaging unit 190 includes an aperture unit 110 and a lens unit 120. Each aperture unit 110 is arranged such that light passing through an aperture 115 passes through the associated lens unit 120, wherein the lens unit 120 focuses the light on an imaging sensor unit 140. Each imaging sensor unit 140 includes a plurality of pixel sensors, wherein each pixel sensor contains a photo sensor for converting a photo signal from the incident light into an electronic signal. Each imaging sensor unit 140 outputs an image signal containing the pixel values of all pixel sensors of an imaging sensor unit 140 in a digitized form.

In accordance with an embodiment, the camera system 100 is a grey scale or black/white camera system. In accordance with another embodiment, the camera system 100 provides colour images, wherein colour filter units 130 are arranged between the lens unit 120 and the imaging sensor unit 140 of each imaging unit 190. Each colour filter unit 130 may comprise a plurality of colour filter sections, wherein each colour filter section has a filter colour, for example blue, red, green, or white. Each colour filter section may be assigned to one single pixel sensor such that each pixel sensor receives colour-specific image information and each imaging sensor unit 140 outputs two, three, four or more different image sub-signals, each image sub-signal containing image information with regard to another filter colour.

The camera system 100 includes at least two imaging units 190, wherein both imaging units 190 have aperture units 110 with different aperture sizes of the apertures 115. The camera system 100 may include further imaging units 190. One or more of the further imaging units 190 may include an aperture unit 110 having the same aperture size as one of the aperture units 110 of the first two imaging units 190. According to another embodiment, each aperture unit 110 of the camera system 100 has another aperture size.

The imaging units 190 may be arranged such that one of them gives a reference image unit, at least one other imaging unit 190 is displaced along a first direction with regard to the reference imaging unit 190 and at least one further imaging unit 190 is displaced along a second direction with regard to the reference imaging unit, wherein the second direction is perpendicular to the first direction. For example, the camera system 100 includes an even number of imaging units 190, which may be arranged matrix-like in rows and columns. In accordance with an embodiment, the camera system 100 includes four imaging units 190, wherein the apertures 115 of all aperture units 110 differ from each other in size. In FIG. 1, the imaging unit 190 on top of the Figure has the widest aperture size and the image unit 190 at the bottom of the Figure has the narrowest aperture 115. The shape of the apertures 115 may be a circle or approximately a circle.

In accordance with an embodiment the aperture units 110 are controlled such that their apertures 115 are open during an exposure period and closed in the rest. In accordance with an embodiment, all aperture units 110 are synchronously controlled such that the apertures 115 are open at overlapping periods. For example, the apertures 115 are opened at the same point in time and remain open for the same period. According to another embodiment, the aperture units 110 are controlled such that the exposure period for all imaging units 190 starts at the same point in time, wherein the exposure period for each imaging unit 190 depends on its aperture size. The aperture units 110 may be adapted for allowing an adjustable aperture size for exposure. For example, the aperture units 110 may be configured such that the area relationships between the apertures 115 remain the same during a global adjustment of the apertures 115.

The imaging units 190 output image signals representing primary images. The imaging units 190 are configured such that the primary images of all imaging units 190 represent shifted versions of the same imaged scene or object. Thereby one of the primary images may be defined as a reference image and the other primary images feature different shift values, wherein a shift value describes a displacement of the respective other primary image relative to the reference image. According to an embodiment, referring to the reference image at least one of the primary images features a sub-pixel shift with regard to a first direction and at least one other of the primary images feature a sub-pixel shift with regard to a second direction which is perpendicular to the first direction. According to an embodiment, the shift values are not integer multiples of the pixel resolution. Each shift value may be the half pixel resolution or width in the corresponding direction or an odd multiple of the respective half pixel resolution or width.

A processing unit 200 receives the primary images and combines or fuses the primary images to an output image using information describing the shift values and information describing the different aperture sizes. According to an embodiment, the processing unit 200 includes a pre-processing unit 210 transferring sharpness information contained in primary images obtained at narrow apertures to primary images obtained at wider apertures for obtaining pre-processed images.

In accordance with an embodiment the processing unit 200 contains a first image formation unit 240 which performs a high-dynamic range imaging process on the basis of shift-compensated images obtained from the primary images or pre-processed images derived from the primary images by sharpness transfer. For shift-compensation, the first imaging unit 240 may estimate from primary or pre-processed primary images displaced images, wherein the displacement is specified by the shift value assigned to the respective primary or pre-processed image.

Alternatively or in addition the processing unit 200 may contain a second image formation unit 260 configured to perform a super-resolution imaging process on the basis of exposure-compensated images derived from the primary images or pre-processed images obtained from the primary images. Before performing a super-resolution imaging process, a compensation unit may compensate for effects resulting from exposure at different aperture sizes in the primary or pre-processed images.

Both the high-dynamic range imaging process or the super-resolution imaging process may output an output image that may be stored in a non-volatile memory 310 of the camera system 100, which may be displayed on a display device on the camera system 100 or which may be output to another system connected to the camera system 100. The processing unit 200 may further include an aperture control unit 280 controlling an aperture driver unit 118, for example for allowing to the apertures 115 of the aperture units 110 to adapt to various illumination conditions.

Figure 2A:
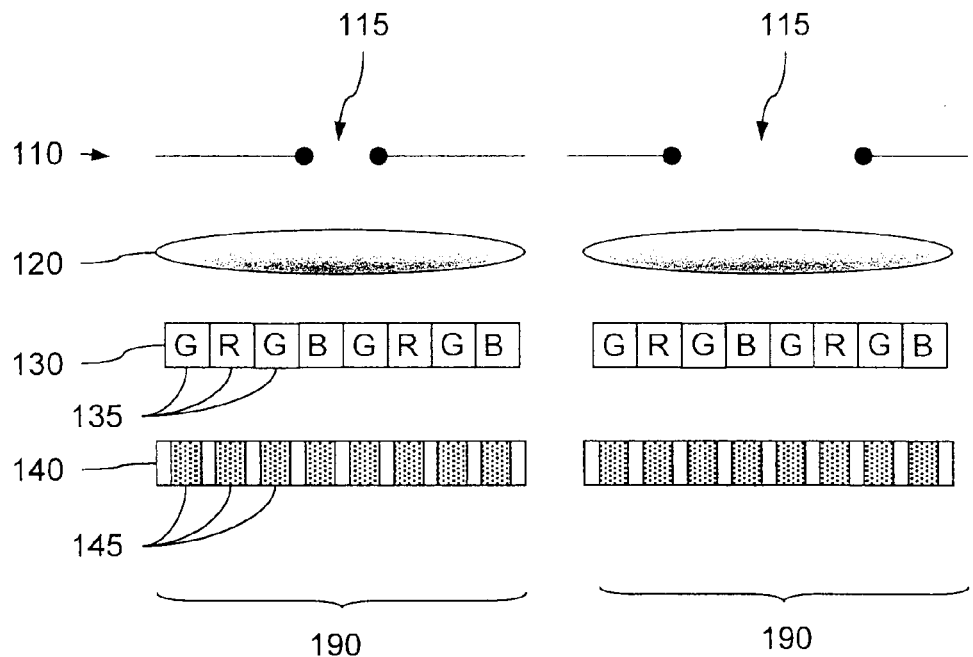
FIG. 2A is a schematic cross-sectional view of two imaging units of a camera system in accordance with another embodiment of the invention.

FIG. 2A refers to a schematic cross-sectional view of two imaging units 190. Each imaging unit 190 includes an aperture unit 110. During an exposure period light passing through an aperture 115 of the aperture unit 110 incidents on and passes through a lens unit 120 which focuses an image of a scene or object onto an imaging sensor unit 140. Each imaging sensor unit 190 comprises a plurality of pixel sensors 145. Each pixel sensor 145 contains a photo sensor that converts a photo signal from the incident light into an electronic signal. The pixel sensors 145 may be formed in a semiconductor substrate. In accordance with an embodiment, each pixel sensor 145 receives white light image information. In accordance with other embodiments, all or some of the imaging units 190 comprise colour filter units 130 that may be arranged between the lens unit 120 and the imaging sensor unit 140 or between the aperture unit 110 and the lens unit 120.

Each colour filter 130 may include a plurality of colour filter sections 135, wherein each colour filter section 135 has a filter colour, for example green, red, blue, magenta, yellow or white. Each colour filter section 135 is assigned to one single pixel sensor 145 such that each pixel sensor 145 receives colour-specific image information. For example, the colour filter sections 135 may be arranged matrix-like in columns and rows. Colour filter sections 135 assigned to different filter colours may alternate along the row direction and the column direction in a regular manner. For example, each four colour filter sections 135 forming a 2×2 matrix may be arranged to form a Bayer mosaic pattern, wherein colour filter sections 135 with the filter colour "green" are arranged on a first diagonal of the 2×2 matrix, and one colour filter section 135 with a filter colour "red" and one colour filter section 135 with the filter colour "blue" are arranged on the other diagonal of the 2×2 matrix. With the Bayer mosaic pattern, the sampling rate for the filter colour "green" is twice that of the filter colours "red" and "blue" to take into account that the colour green caries most of the luminance information for the human eye.

Each lens unit 120 may be realized as micro-lens array including a plurality of segments. Each lens segment of a lens unit 120 may be assigned to one single pixel sensor 145 and one colour filter section 135.

Figure 2B:
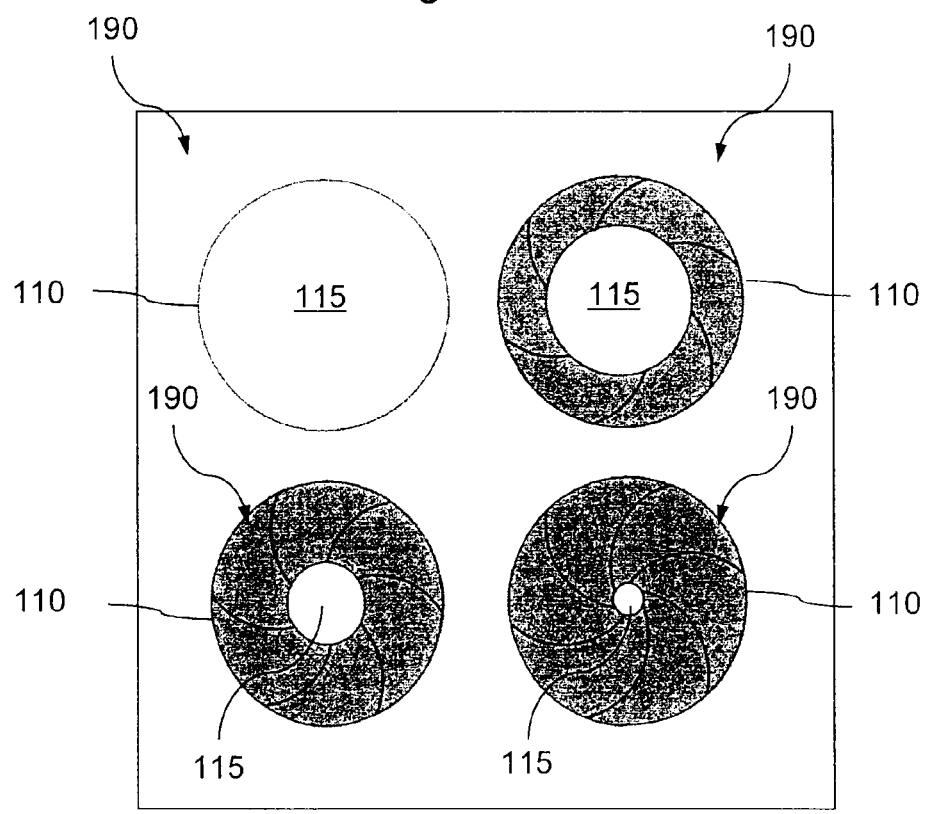
FIG. 2B is a schematic top view of an arrangement including four imaging units according to an embodiment.

FIG. 2B is a top view of four imaging units 190 of FIG. 2A during an exposure period. The imaging units 190 with the aperture units 110 are arranged in a 2×2 matrix. At least two of the apertures 115 of the aperture units 110 differ in size during the exposure period. According to an embodiment, all apertures 115 have different sizes. According to another embodiment, a true subset of the apertures 115 may have the same aperture size during exposure. The aperture units 110 may be an iris-like mechanism allowing different aperture sizes. According to another embodiment, the aperture size of each imaging unit is fixed using, for example, a sputtered and patterned opaque layer deposited onto the lens unit, by way of example, wherein another mechanism realizes the shutter function for limiting the exposure period.

Figure 3A:
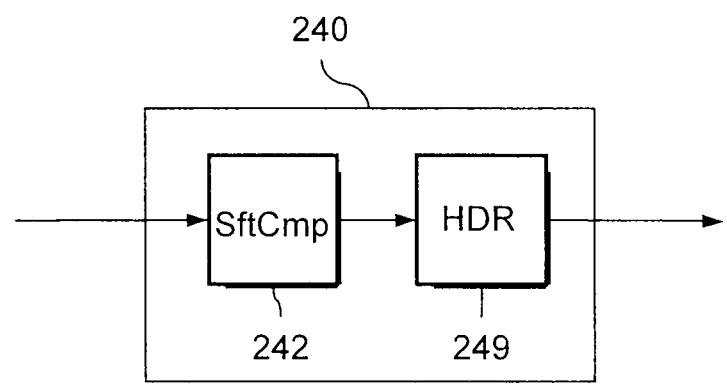
FIG. 3A is a schematic block diagram of a detail of a processing unit of a camera system including high-dynamic range imaging processing in accordance with an embodiment of the invention.

FIG. 3A shows details of a first image formation unit 240 of a processing unit 200 for the camera system 100 of FIG. 1 allowing high-dynamic range processing. The first image formation unit 240 may receive the primary images output by the imaging units 190 or pre-processed images obtained from the primary images by sharpness transfer. The first image formation unit 240 may comprise a shift compensation unit 242 that, in the received images, compensates for the shift among the images on the basis of the known shift values and optical distortions occurring when displaced images are used. The shift compensation unit 242 may further compensate for global motion and correct for distortion.

The shift and compensation unit 242 may perform sub-pixel motion compensation for outputting a number of quasi-congruent images of the same scene obtained at different aperture sizes and therefore with different depth-of-field and exposure value ranges. A high-dynamic range calculation unit 249 generates a high dynamic range output image from the plurality of quasi-congruent images.

A camera system 100 as illustrated in FIG. 1 with the first image formation unit 240 of FIG. 3A captures a plurality of images contemporaneously such that no or approximately no random motion occurs, neither in the camera system nor in the image scene. No or few motion estimation and compensation is required to allow the images for the high-dynamic range image formation. Instead, conventional approaches using sequential image capturing, require motion estimation and compensation. However conventional motion compensation is based on images having the same depth-of-field range, whereas the primary images feature different depth-of-field ranges. Computational effort can be saved. With the image formation unit 240 of FIG. 3A and the imaging units 190 of FIG. 1, the camera system 100 may capture multiple images at different aperture settings and sub-pixel shifts among each other in a single shot. Since all images are taken at the same instance of time, no motion estimation is required and the sub-pixel shift among the images captured is set by the known distance among the lens units 120 of the imaging units 190.

Figure 3B:
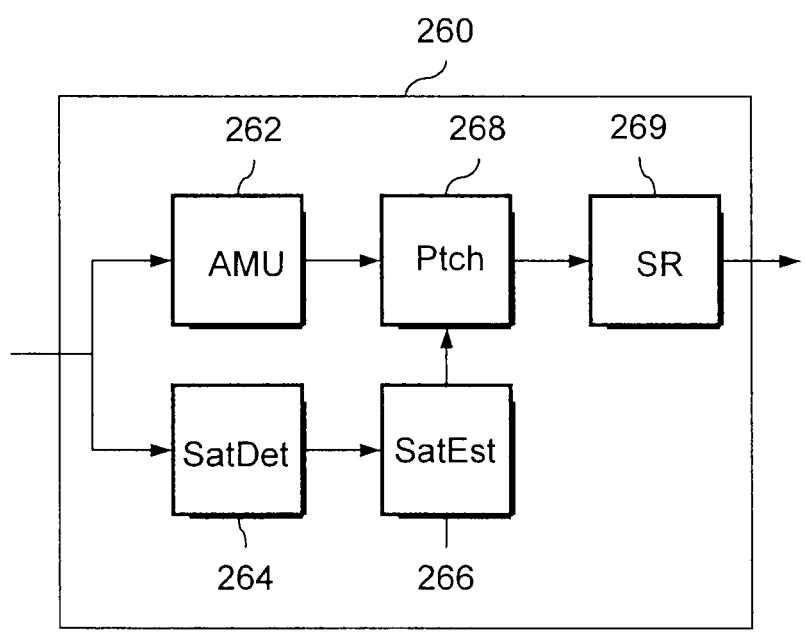
FIG. 3B is a schematic block diagram of a detail of a processing unit of a camera system including super-resolution image processing and over-exposure compensation according to other embodiments.

FIG. 3B shows details of a second image formation unit 260 of a processing unit 200 for the camera system 100 of FIG. 1 allowing super-resolution approaches. The second image formation unit 260 may perform a super-resolution imaging process on the basis of exposure-compensated images, wherein the exposure-compensated images are obtained from the primary images or pre-processed primary images derived from the primary images by compensating for effects resulting from exposure at different aperture sizes.

According to an embodiment, the second image formation unit 260 comprises an aperture matching unit 262 which obtains a pre-compensated image from each primary or pre-processed image such that the pre-compensated images have the same exposure level. According to an embodiment, the aperture matching unit 262 uses a linear relationship between the luminance level and an exposure value defined by the respective aperture size for equalizing the exposure levels of the primary images. For example, the exposure levels may be lowered to the exposure level of the primary image obtained with the narrowest aperture. According to an embodiment, the aperture matching unit 262 lifts the exposure levels of the primary images output by those imaging units having an aperture size smaller than the largest aperture size among all imaging units of the camera system to that of the primary image output by the imaging unit with the widest aperture.

According to a further embodiment, the second image formation unit 260 further includes a saturation detection unit 264 detecting, in the primary images or pre-processed primary images such pixel values which are generated by pixel sensors being saturated as a consequence of over-exposure, in particular in those primary images output from imaging units having a wide aperture. The information concerning these pixels is lost and cannot be recovered such that concerned pixel values have to be interpolated. According to an embodiment, saturated pixel values in the primary images generated by the imaging units 190 with wider apertures are identified by using the primary image obtained from the imaging unit 190 with the smallest aperture, which is the least exposed one.

For example, if the saturation value is considered to be 255 and the difference between two images corresponds to two EVs (exposure values) the image with higher EV has four times more luminance. Therefore all pixel locations in the lower exposed image with a pixel value ≥255/4 identify saturated pixel value locations in the primary image from the imaging unit 190 with the wider aperture. The information output from the saturation detection unit 264 identifies over-exposed pixel values and may be used to improve the information output by the aperture matching unit 262.

In accordance with an embodiment, the second image formation unit 260 includes an estimation unit 266 that estimates true pixel values in the more exposed images, for example by extrapolating them from corresponding pixel values in the least exposed image on the basis of a linear relationship between luminance and exposure value. The estimation unit 266 outputs the estimated values for the saturated values in the primary images. A patch unit 268 may be provided that replaces in the image information output from the aperture matching unit 262 over-saturated pixel values with the estimated pixel values as output by the estimation unit 266. According to an embodiment the estimation unit 266 may also use pixel information from pixels neighbouring the saturated pixel. A similar approach may also be applied for high-dynamic range processing.

The second image formation unit 260 further comprises a super-resolution calculation unit 269, which applies a super-resolution algorithm on the saturation-compensated images to output a high-resolution image. The embodiment of FIG. 3B allows applying a super-resolution algorithm on images obtained at different exposure levels and having different depth-of-field ranges.

Figure 3C:
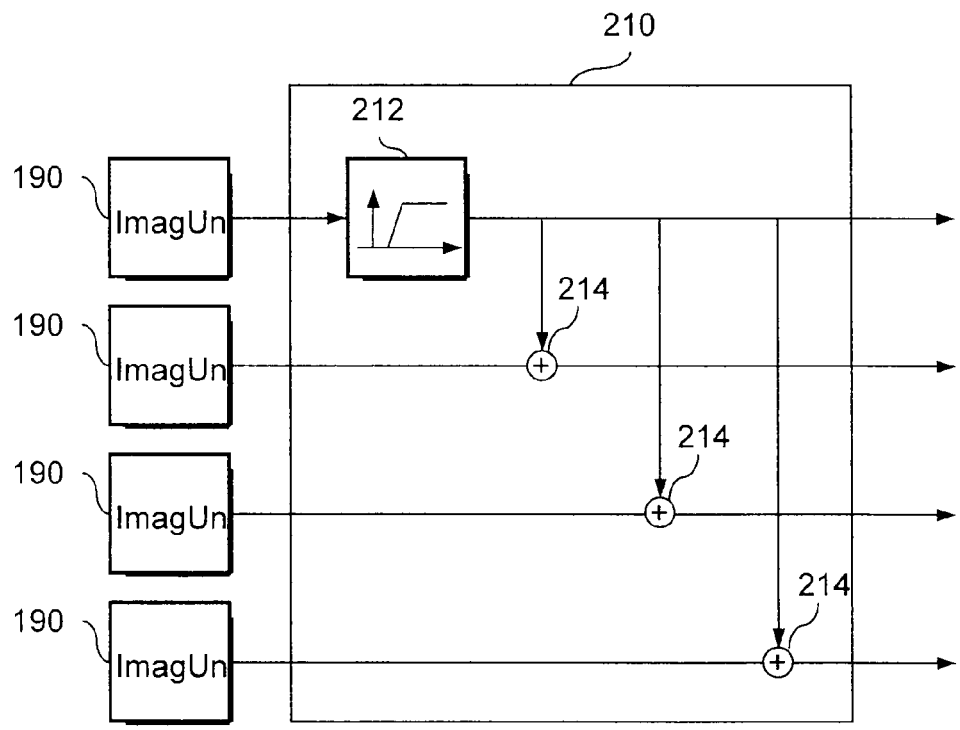
FIG. 3C is a schematic block diagram of a detail of a processing unit of a camera system concerning sharpness transport in accordance with further embodiments of the invention.

FIG. 3C refers to a detail of the processing unit 200 of FIG. 1 concerning a sharpness transfer from one or more primary images obtained by using narrow aperture sizes to one or more primary images obtained by using wider apertures to get an all-in-focus super-resolution or HDR image. According to an embodiment, a pre-processing unit 210 of the processing unit 200 contains a high-pass filter 212 which extracts spatial sharpness information along two orthogonal directions from the primary image obtained from the imaging unit 190 having the narrowest aperture. Summation units 214 add the spatial sharpness information output by the high-pass filter 212 to each other of the primary images output from the imaging units 190 having an aperture wider than the narrowest aperture. In accordance with other embodiments, the sharpness information from more than one imaging unit may be applied using different weights.

All elements of the processing unit 200 may be embodied by hardware only, for example as integrated circuits, FPGAs (feed programmable gate arrays), ASICs (application specific integrated circuits), by software only, which may be implemented, for example in a computer program or a microcontroller memory, or by a combination of hardware and software.

Figure 4:
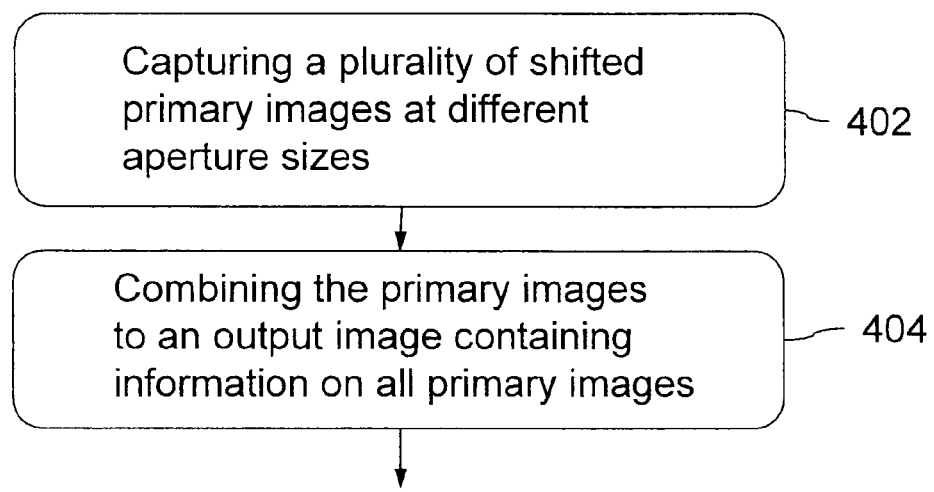
FIG. 4 is a simplified flowchart referring to a method of operating a camera system in accordance with yet another embodiment of the invention.

FIG. 4 refers to a method of operating a camera system. The method provides capturing at least two primary images of the same scene with the corresponding number of imaging units having different aperture sizes during an exposure period, wherein the primary images are shifted versions of the same scene and feature different depth-of-field and exposure value ranges (402). The at least two primary images are fused or combined with each other to obtain an output image (404) using information on the different exposure levels and shift values, wherein the output image contains information derived from all primary images.

The method may include transferring sharpness information from the primary images obtained from imaging units with narrow apertures into the primary images obtained from imaging units with wider apertures to obtain pre-processed images. Transferring the sharpness information may comprise high-pass filtering the primary image obtained from the imaging unit having the narrowest aperture in order to extract the sharpness information and then adding the obtained sharpness information to at least one of the other primary images.

The method may further comprise performing a high-dynamic range imaging process on the basis of shift-compensated images obtained from the primary or pre-processed primary images by estimating a displaced image from the primary image or the pre-processed image wherein the displacement between the images is defined by a shift value predetermined by the hardware configuration of the imaging units.

According to another embodiment, combining primary images may include a super-resolution imaging process on the basis of exposure-compensated images. The exposure-compensated images are obtained from the primary or the pre-processed primary images by compensating for effects resulting from exposure at different aperture sizes.

The invention claimed is:

1. A camera system comprising:
   at least two imaging units, each imaging unit comprising a lens unit and an aperture unit wherein each aperture unit is configured to pass light through an aperture during an exposure period and each aperture unit is arranged such that light passing through its aperture passes through the respective lens unit; and
   a processing unit configured to combine primary images obtained from the imaging units to an output image, wherein
   the apertures of the at least two aperture units have different sizes,
   one of the primary images is a reference image and the other primary images feature different shift values describing the displacement of the respective other primary image relative to the reference image,
   the processing unit comprises a pre-processing unit configured to transfer sharpness information from primary images obtained from imaging units with narrow apertures into primary images obtained from imaging units with wide apertures to obtain pre-processed images, and
   the pre-processing unit comprises a high-pass filter configured to extract sharpness information from the primary image obtained from an imaging unit having the narrowest aperture and summation units, each summation unit configured to add the sharpness information to one of the other primary images to obtain the pre-processed images.

2. The camera system of claim 1, wherein
the number of imaging units is even and the imaging units are arranged in a matrix.

3. The camera system of claim 1, wherein
each imaging unit further comprises an imaging sensor unit configured to output the respective primary image.

4. The camera system of claim 1, wherein
the primary images are shifted versions of one single image scene.

5. The camera system of claim 1, wherein
the shift values have a sub-pixel region with a resolution lower than a pixel resolution of the imaging units.

6. A camera system comprising:
   at least two imaging units, each imaging unit comprising a lens unit and an aperture unit wherein each aperture unit is configured to pass light through an aperture during an exposure period and each aperture unit is arranged such that light passing through its aperture passes through the respective lens unit; and
   a processing unit configured to combine primary images obtained from the imaging units to an output image, wherein
   the apertures of the at least two aperture units have different sizes,
   one of the primary images is a reference image and the other primary images feature different shift values describing the displacement of the respective other primary image relative to the reference image, and
   the processing unit comprises a first image formation unit configured to perform a high-dynamic range imaging process on the basis of shift-compensated images, each shift-compensated image obtained from one of the primary or one of the pre-processed images by estimating each primary or pre-processed image a displaced image, the displacement specified by the respective shift value.

7. A camera system comprising:
   at least two imaging units, each imaging unit comprising a lens unit and an aperture unit wherein each aperture unit is configured to pass light through an aperture during an exposure period and each aperture unit is arranged such that light passing through its aperture passes through the respective lens unit; and
   a processing unit configured to combine primary images obtained from the imaging units to an output image, wherein
   the apertures of the at least two aperture units have different sizes,
   one of the primary images is a reference image and the other primary images feature different shift values describing the displacement of the respective other primary image relative to the reference image, and
   the processing unit comprises a second image formation unit configured to perform a super-resolution imaging process on the basis of exposure-compensated images, each exposure-compensated image obtained from one of the primary or one of the pre-processed images by compensating for effects resulting from exposure at different aperture sizes.

8. The camera system of claim 7, wherein
the second image formation unit comprises an aperture matching unit configured to obtain, from each primary or pre-processed image, a pre-compensated image, each pre-compensated image having the same exposure level, based on the linear relationship between luminance level and an exposure level defined by the respective aperture size.

9. The camera system of claim 8, wherein
the second image formation unit comprises a saturation detection unit configured to detect, in the primary or pre-processed image processes, saturated pixel values resulting from over-exposure.

10. The camera system of claim 9, wherein
the second image formation unit comprises an estimation unit configured to estimate pixel values for the saturated pixel values and a patch unit configured to replace, in the pre-compensated images, saturated pixel values with the estimated pixel values.

* * * * *